United States Patent [19]

Konecny et al.

[11] Patent Number: 4,872,710
[45] Date of Patent: Oct. 10, 1989

[54] RELEASABLE QUICK CONNECT FITTING

[75] Inventors: James W. Konecny, Fort Worth; Rodney L. Huston, Springtown; Gerrard N. Vyse, Bedford, all of Tex.

[73] Assignee: Stratoflex, Inc., Fort Worth, Tex.

[21] Appl. No.: 256,156

[22] Filed: Oct. 7, 1988

Related U.S. Application Data

[63] Continuation of Ser. No. 932,515, Nov. 20, 1986, abandoned.

[51] Int. Cl.[4] ............................................. F16L 37/22
[52] U.S. Cl. ..................................... 285/81; 285/318; 285/321
[58] Field of Search ................... 285/321, 318, 344, 81

[56] References Cited

U.S. PATENT DOCUMENTS

| | | |
|---|---|---|
| 882,406 | 3/1908 | Morgan . |
| 2,693,378 | 11/1954 | Beyer . |
| 2,846,240 | 8/1958 | Beyer .............................. 285/318 X |
| 2,848,135 | 8/1958 | Rickard et al. ................. 285/318 X |
| 2,848,255 | 8/1958 | Klein et al. ..................... 285/321 X |
| 3,218,095 | 11/1965 | Wiltse ................................ 285/318 |
| 3,439,944 | 4/1969 | Leutenegger ........................ 285/321 |
| 3,540,760 | 11/1970 | Miller et al. ........................ 285/321 |
| 3,584,902 | 6/1971 | Vyse ..................................... 285/305 |
| 3,637,239 | 1/1972 | Daniel .............................. 285/321 X |
| 3,718,350 | 2/1973 | Klein ................................. 285/321 X |
| 3,724,880 | 4/1973 | Seller ................................ 285/321 X |
| 3,773,360 | 11/1973 | Timbers ........................... 285/321 X |
| 3,847,393 | 11/1974 | Busselmeier .................... 285/321 X |
| 4,055,359 | 10/1977 | McWethy ....................... 285/347 X |
| 4,063,760 | 12/1977 | Moreiras ......................... 285/321 X |
| 4,111,464 | 9/1978 | Asano et al. .................... 285/321 X |
| 4,240,654 | 12/1980 | Gladieux ......................... 285/321 X |
| 4,278,276 | 7/1981 | Ekman ............................ 285/321 X |
| 4,376,525 | 3/1983 | Fremy ............................. 285/321 X |
| 4,401,326 | 8/1983 | Blair ............................... 285/321 X |
| 4,565,392 | 1/1986 | Vyse ............................... 285/321 X |
| 4,678,210 | 7/1987 | Balsells ............................ 285/318 |

FOREIGN PATENT DOCUMENTS

| | | |
|---|---|---|
| 654535 | 10/1964 | Belgium . |
| 637102 | 2/1962 | Canada . |
| 865885 | 2/1953 | Fed. Rep. of Germany ...... 285/344 |
| 1305096 | 8/1962 | France . |
| 561834 | 6/1977 | U.S.S.R. ............................. 285/321 |

Primary Examiner—Thomas F. Callaghan
Attorney, Agent, or Firm—Marshall, O'Toole, Gerstein, Murray & Bicknell

[57] ABSTRACT

This disclosure relates to a releasable quick-connect fitting, comprising an insert having an annular lock groove and an annular release groove in the outer periphery thereof, the release groove having a smaller diameter than the lock groove. A receptacle has a bore for receiving the insert and an annular bore groove is formed in the bore. An annular retainer is mounted in one of the lock and release grooves and movable to the other of the grooves. The insert is movable to a lock position in the receptacle wherein the lock and bore grooves are substantially in radial alignment and the retainer extends into said lock and bore grooves, and movable to a release position in the receptacle wherein the release and bore grooves are substantially in radial alignment and the retainer extends into the release groove. A stop is removably connected to one of the insert and receptacle and engageable with the other, the stop preventing movement of the insert to the release position but enabling movement to the release position when removed.

17 Claims, 2 Drawing Sheets

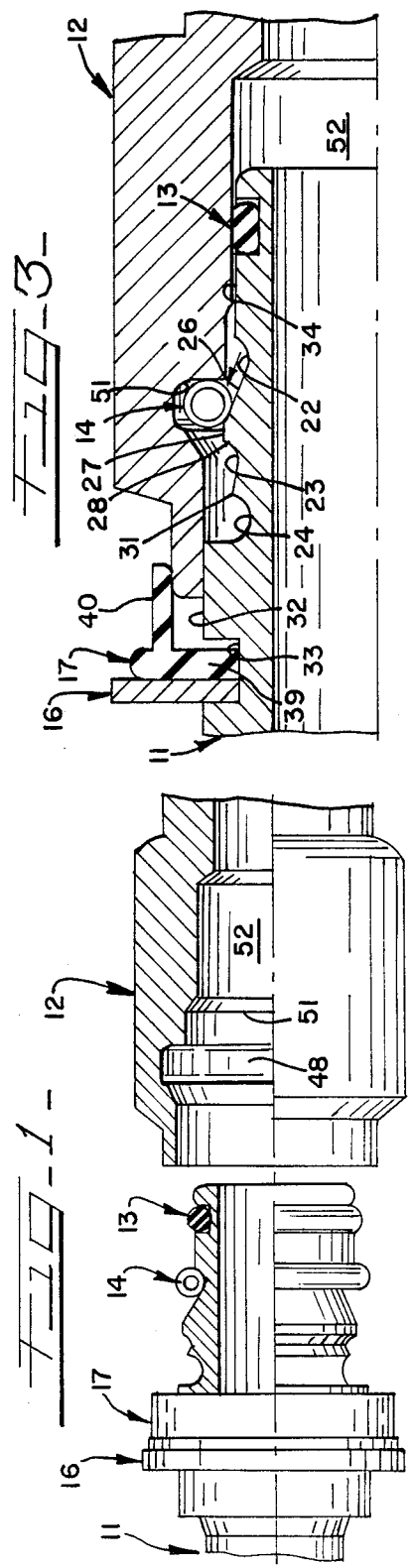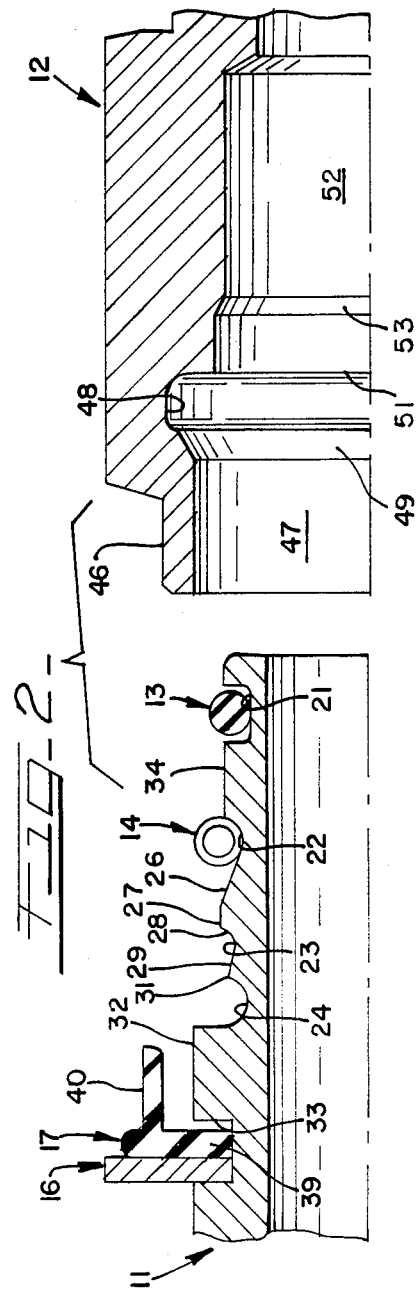

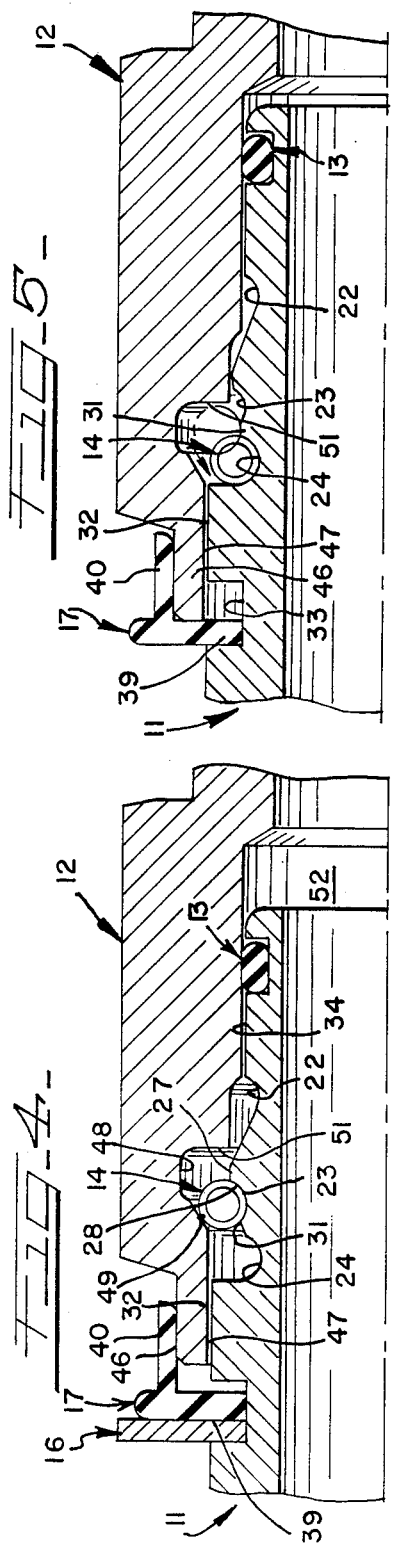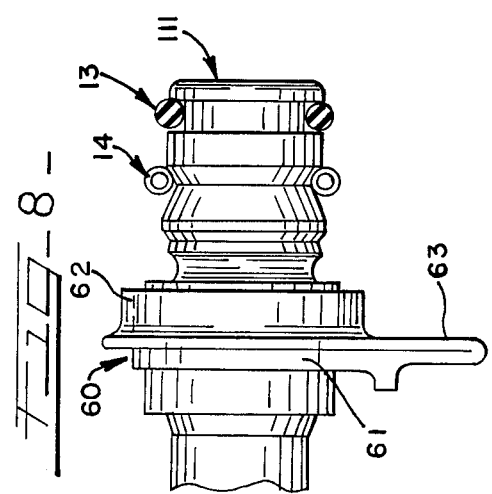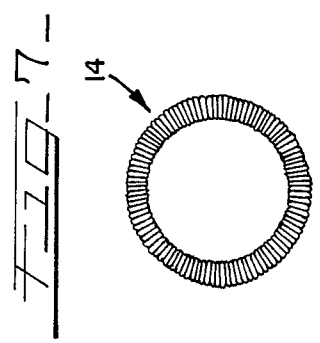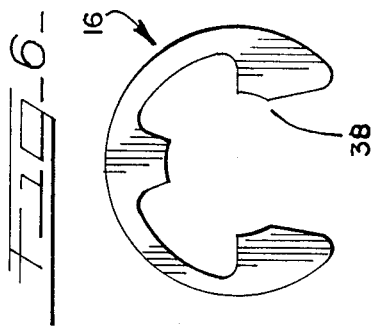

RELEASABLE QUICK CONNECT FITTING

This application is a continuation of application Ser. No. 935,515 filed Nov. 20, 1986, and now abandoned.

FIELD AND BACKGROUND OF THE INVENTION

This invention relates to a quick-connect hose fitting which has an easy disconnect feature.

Quick-connect fittings are well known in the art, and one such design is described in G. N. Vyse U.S. Pat. No. 4,565,392 dated Jan. 21, 1986. Fittings of this type usually include a nipple or insert member which, during assembly, is inserted into a bore of a socket or receptacle part, and an expansible split ring extends across annular grooves of the two parts in order to secure them together Quick-connect fittings have also been provided which include means for enabling the two parts to be disassembled when desired. For example, U.S. Pat. Nos. 3,540,760 and 4,063,760 describe fittings including screw-on sleeves which, when removed from the other parts, release the ring and thereby enable the fittings to be disassembled.

Further, U.S. Pat. No. 4,055,359 discloses a quick-connect fitting including an expansible ring for holding the fitting parts together, and a movable cage for expanding the ring in order to disconnect the fitting.

A disadvantage of the prior art fittings which may be disconnected is that the mechanisms are relatively elaborate and therefore expensive. The designs with screw-on sleeves have the further disadvantage that parts must be unscrewed in order to disconnect them, and the design in patent No. 4,055,359 requires a special cage around the fitting.

It is a general object of this invention to provide a quick-connect fitting which may be released or disconnected when needed, and which is relatively inexpensive to construct and simple to operate.

SUMMARY OF THE INVENTION

A releasable quick-connect fitting according to the invention comprises tubular insert and receptacle parts, the insert being movable into the receptacle on the axis of the parts. The insert has annular load, lock and release grooves in its outer periphery, the grooves respectively having first, second and third radial dimensions. The lock groove is between the load and release grooves and has a larger radial dimension than the load and release grooves. An annular expansible retainer is mounted in one of the three grooves. The receptacle has a forward end with a first bore diameter which is larger than the outer diameter of the retainer when the retainer is in either the load or release grooves but less than the outer diameter of the retainer when the retainer is in the lock groove. The receptacle further has a push surface spaced rearwardly from the forward end, the push surface having a second bore diameter which is less than the outer diameter of the retainer when in any of the grooves, and the push surface moves the retainer from the load groove to the lock groove during assembly of the parts. The fitting further includes a removable stop for limiting the extent of forward movement of the insert into the receptacle during assembly to prevent the push surface from moving the retainer to the release groove. When the stop is removed, however, the insert may be moved forwardly to a position where the push surface moves the retainer to the release groove, thereby enabling disassembly of the parts.

BRIEF DESCRIPTION OF THE DRAWINGS

The invention will be better understood from the following detailed description taken in conjunction with the accompanying figures of the drawing, wherein:

FIG. 1 is a view partially in section showing a fitting in accordance with the invention in uncoupled form;

FIG. 2 is an enlarged sectional view showing the fitting parts;

FIG. 3 is an enlarged view showing the parts during assembly;

FIG. 4 is an enlarged view showing the parts in the locked position;

FIG. 5 is an enlarged view showing the parts in the release position;

FIG. 6 is a plan view showing a stop of the fitting;

FIG. 7 is a plan view showing a retainer of the fitting; and

FIG. 8 shows an alternative form of the fitting.

DETAILED DESCRIPTION OF THE DRAWINGS

With reference first to FIG. 1, a fitting in accordance with the invention comprises a tubular nipple or insert part 11 and a tubular receptacle or socket part 12. The parts 11 and 12 are releasably connectable to each other as will be described, and the left-hand end of the insert 11 and the right-hand end of the receptacle 12 are designed to be coupled in a conventional fashion to other parts (not shown) such as tubes, hose, etc. The parts 11 and 12 have interior passageways for the flow of a liquid or gas or for a vacuum. The fitting further includes, mounted on the outer periphery of the insert 11, an annular 0-ring 13, a annular retainer 14 (also see FIG. 7), a stop 16 (also see FIG. 6), and a dust guard 17 which is optional.

With specific reference to FIG. 2, the O-ring 13 is mounted in an annular groove 21 formed in the outer periphery of the insert 11 adjacent the forward (or right-hand, as seen in FIGS. 1 and 2) end of the insert. Also formed in the outer periphery of the insert 11, spaced to the rear of the groove 21, are a load groove 22 (which is closest to the groove 21), a lock groove 23 and a release groove 24. The three grooves 22, 23 and 24 are annular, and in this specific example the two grooves 22 and 24 have substantially the same diameter. The lock groove 23 is located between the grooves 22 and 24 and its diameter is larger than the other two grooves.

In the space between the load groove 22 and the lock groove 23, the outer surface of the insert angles radially outwardly and rearwardly from the groove 22 and forms a slanted ramp surface 26 which terminates at an apex 27. The apex 27 is connected with the bottom of the lock groove 23 by another slanted surface 28 which slopes radially outwardly and forwardly from the groove 23 to the apex 27. Between the two grooves 23 and 24, a surface 29 slants radially outwardly and rearwardly from the groove 23 to an apex 31 which is essentially at the edge of the release groove 24.

Rearwardly of the release groove 24 is a radially enlarged guide surface 32, and an annular groove 33 is formed in the guide surface 32. Another guide surface 34 is formed between the grooves 21 and 22, the guide surface 34 having a smaller diameter than the other guide surface 32.

The retainer 14 in the present specific example comprises a stretchable coiled metal spring which forms a circle as shown in FIG. 7. Such a spring is commonly referred to as a garter spring. A piece of a coiled spring may be cut and the two ends fastened together to form the annular form shown in FIG. 7. The inner diameter of the retainer 14 is sized so that the retainer 14 is stretched slightly when it is mounted in the load groove 22 (the position shown in FIGS. 1 and 2).

The fitting further comprises the stop 16 which, in the present example, is formed by a conventional E-ring of the type that is normally mounted in a groove on a shaft in order to retain parts on the shaft. The stop 16 is split, thereby forming an opening 38 between its ends, and the sides of the stop are sufficiently flexible that the opening 38 may be enlarged slightly to permit the stop to be snapped into the groove 33 and also to be removed from the groove 33. The internal diameter of the stop 16 is selected so that the stop has a slight amount of tension when it is mounted in the groove 33.

The dust cap 17 is preferably provided when the fitting is at a location where it is subject to dust and dirt. The dust cap comprises an annular radially extending plate portion 39 which is positioned in the groove 33 immediately forwardly (to the right of, as seen in FIG. 2) of the stop 16. An annular flange 40 is formed adjacent the outer end of the plate portion 39, the flange 40 extending forwardly and covering the adjacent end of the receptacle 12 when the parts are fully assembled as shown in FIG. 4. In instances where a dust cap is not required, the cap 17 may be dispensed with and, in this instance, the stop 16 should be located at the position where the dust cap 17 is presently shown in FIG. 2. This may be accomplished by shortening the axial dimension of the groove 33 so that the stop 16 will be located to the right of its position shown in FIG. 2, or the stop 16 may be positioned in the groove 33 where the plate 39 of the dust cap is illustrated in FIG. 2 and a spacer (not shown) positioned in the groove 33 to the left of the stop 16.

The receptacle 12 comprises a forward end 46 (toward the left as seen in FIG. 2) having an internal bore, the surface 47 of this bore having a diameter that is slightly greater than the outer diameter of the retainer 14 when the retainer 14 is in either the load groove 22 or the release groove 24. The diameter of the bore surface 47 is also slightly larger than the diameter of the guide surface 32. Accordingly, when the insert 11 with the retainer 14 in the load groove 22 is moved toward the right as seen in FIGS. 1 and 2 and moved into the interior of the receptacle 12, the surface 47 moves over the outside of the O-ring 13 and the retainer 14 and it slides on the guide surface 32. The thickness of the forward portion 46 is sized to enable the portion 46 to move between the guide surface 32 and the flange 40 of the dust cap, as illustrated in FIG. 3. Since the portion 46 slides on the guide surface 32, the movement of the insert is guided and aligned properly with the bore of the receptacle during assembly.

Spaced rearwardly (to the right, as seen in FIGS. 1 and 3) of the forward portion 46 of the receptacle is an annular groove 48 which has sufficient dimensions to allow the retainer 14 to be moved into it. The radial dimension of the groove 48 is sufficiently large that it will receive the retainer 14 when the retainer is on top of the apex 27. The forward side of the groove 48 includes a slanted surface 49 that extends from the bore surface 47 to the bottom of the groove 48. At the rearward side of the groove 48 is a radially extending push surface 51 which extends from the bottom of the groove 48 radially inwardly to a reduced diameter bore 52 which has a slightly greater radial dimension than the guide surface 34 of the insert. Consequently, when the insert is being moved into the interior of the receptacle, the guide surface 34 is guided by the reduced diameter bore 52 and at the same time the guide surface 32 is guided by the bore surface 47 at the forward end of the receptacle. The bore 52 may include a small radially outwardly extending step 53 to better enable the receptacle to slide over the 0-ring 13 without damaging it.

Considering the construction and assembly of the fitting, the stop 16 and, assuming one is provided, the dust cap 17 are mounted in the groove 33, the retainer 14 is mounted in the load groove 22, and the O-ring 13 is mounted in the groove 21. The dust cap 17 may be made of a stretchable material such as rubber or polyethylene so that it may be stretched and moved over the end of the nipple to mount it in the groove 33. The insert 11 is then moved toward the right from the position shown in FIG. 2 to the position shown in FIG. 3, and the guide surface 34 of the insert moves into the bore 52. The O-ring 13 is compressed by the bore surface 52 as shown in FIG. 3. The push surface 51 engages the forward side of the retainer 14 and pushes the retainer 14 up the slanted surface 26 as the insert is moved into the receptacle. The retainer 14 is moved by the surface 51 over the apex 27 and, due to the stretch or tension in the retainer 14, it then snaps into the lock groove 23. This position is shown in FIG. 4 wherein the parts are in the lock position. The forward end 46 of the receptacle 12 is located between the guide surface 32 and the flange 40 of the dust cap 17, the guide surfaces 32 and 34 of the insert are closely adjacent the bore surfaces 47 and 52 so that the insert cannot tilt in the receptacle, the 0-ring 13 is compressed as shown in FIGS. 4 and 5 and forms a seal, and the retainer 14 is in the lock groove 23. As shown in FIG. 4, the diameter of the bore surface 47 is less than the outer diameter of the retainer 14 when the retainer is located in the lock groove 23. Consequently, internal pressure tending to separate the parts of the fitting or any attempt to move the insert 11 to the left or out of the receptacle 12 causes the slanted surface 49 of the receptacle to engage one side of the retainer 14 whereas the other side of the retainer is engaged by the slanted side 28 of the groove 23. The retainer 14 extends into both grooves 23 and 48 and it is wedged between the two slanted surfaces 49 and 28, and the fitting parts are thereby securely locked together. The surface 49 cams or wedges the retainer toward the bottom of the lock groove 23.

With reference to FIG. 4, it should be noted that the axial dimensions of the insert 11 and the receptacle 12 are such that, when the forward end 46 of the receptacle is moved tightly against the radial portion 39 of the dust cap 17, the push surface 51 will be over the apex 27 and nevertheless does not engage the retainer 14 which is in the lock groove 23. Further, the apex 31 between the lock groove 23 and the release groove 24 prevents the retainer 14 from accidentally moving into the release groove 24 because the retainer 14 would have to stretch in order to expand over the apex 31.

It is sometimes desirable to disassemble the fitting for maintenance purposes in order to replace the O-ring 13, for example, or to service the parts connected to the insert 11 and/or the receptacle 12. The fitting is therefore designed to be releasable so that the insert 11 may be withdrawn from the receptacle 12.

Disassembly of the fitting, for whatever purpose, is accomplished simply by first removing the stop 16. Without the stop 16 filling part of the groove 33, the insert 11 may be moved an extended distance slightly farther in its forward direction (toward the right) to the position shown in FIG. 5 where the forward end 46 of the receptacle engages the dust cap 17 and the dust cap is moved to the left-hand end of the groove 33. During this extended movement to the release position, the push surface 51 moves the retainer 14 from the lock groove 23 to the release groove 24 and over the apex 31. As previously mentioned, the release groove 24 has a smaller diameter than the lock groove 23, and it is sufficiently small that the retainer 14, when moved into the groove 24, does not block the movement of the insert 11 out of the receptacle 12. In other words, the diameter of the bore 47 is slightly greater than or approximately equal to the outer diameter of the retainer 14 when the retainer is located in the release groove 24.

When the fitting is to be reassembled, the stop 16 is placed back in the groove 33 in the position shown in FIGS. 1-4 and the retainer 14 is manually moved from the release groove 24 to the load groove 22. It is preferred that the O-ring 13 also be replaced at this time. The parts of the fitting may then be reassembled as previously described.

FIG. 8 illustrates an alternative arrangement wherein the stop and the dust cap are formed in one piece. A unitary structure 60 includes a stop portion 61 and a dust cap portion 62. A handle 63 may be provided on one side of the unitary structure 60. The cross sectional configuration of the structure 60 may be essentially the same as that shown in FIG. 2 except that the stop and the dust cap are formed as an integral or single piece. The unitary structure may, for example, be molded from a stretchable plastic which is stretched during assembly in order to slide it over the end of the nipple and mount it in the groove 33 of the insert 11. While the unitary structure 60 (and the dust cap 17) may be somewhat resilient, it normally should not be made too soft because the unitary structure might be compressed by the forward end of the receptacle 12 sufficiently to permit accidental disassembly of the parts.

On the other hand, in some installations it may be desirable to make the unitary structure sufficiently deformable to enable the fitting to be disassembled by manually forcing the insert into the receptacle sufficiently to deform the unitary structure (or the dust cap 17) without removing it. Normally, however, the unitary structure 60 is removed in order to disassemble the fitting by grasping the handle 63 and pulling the structure 60 out of the groove 33.

The O-ring 13 may be mounted in a groove formed in the interior bore 52 of the receptacle 12, although it is preferable to have the O-ring on the insert 11 because it is easier to install and inspect. The dust cap could also be mounted on the end 46 of the receptacle 12 instead of on the insert 11. A retainer 14 formed by a garter spring as described is subject to being flattened somewhat when a high magnitude force is applied to separate the fitting parts. Consequently there is a limit, for a retainer of a given strength, to the internal pressure in the fitting which may be safely introduced.

It will be apparent from the foregoing that a novel and useful quick-connect fitting having a releasable feature has been provided. The various grooves in the insert part and the receptacle are easily machined, and the stop 16 and (where one is provided) the dust cap 17 are easily and inexpensively manufactured and installed. Not only may the fitting be disassembled when desired, it may also be reassembled merely by mounting the stop 16 back in the groove 33. As a consequence, the cost of the fitting is relatively low, it is relatively simple to manufacture and install, and it is reliable in operation.

What is claimed is:

1. A releasable quick-connect fitting, comprising
   (a) a tubular insert having an axis, and having an annular lock groove and an annular release groove in the outer periphery thereof, said lock groove having a forward side which is slanted outwardly and forwardly relative to said axis, and said release groove having a smaller diameter than said lock groove,
   (b) a cylindrical receptacle coaxial with said insert and having a bore for receiving said insert and having an annular bore groove in said bore, said bore groove having a rearward side which is slanted inwardly and rearwardly relative to the axis of said receptacle,
   (c) an annular retainer mounted in one of said lock and release grooves and movable to the other of said lock and release grooves, said retainer comprising a garter spring formed by substantially circular radially extending closely adjacent coils,
   (d) said insert being movable to a lock position in said receptacle wherein said lock and bore grooves are substantially in radial alignment and said retainer extends into said lock and bore grooves, and is wedged between said slanted forward and rearward sides of said grooves and prevents separation of said insert and said receptacle, and said retainer being movable to a release position in said receptacle wherein said release and bore grooves are substantially in radial alignment and said retainer extends into said release groove and is out of engagement with said receptacle, and
   (e) a stop removably connected to one of said insert and receptacle and engageable with the other, said stop preventing movement of said insert to said release position but enabling movement to said release position when removed.

2. A fitting as in claim 1, wherein said receptacle includes a push surface located to move said retainer from said lock groove to said release groove.

3. A fitting as in claim 2, wherein said insert further has an annular load groove formed in the outer periphery thereof, a sloped surface extending radially outwardly and rearwardly from said load groove to said lock groove, said garter spring being initially mounted in said load groove, and said push surface being located to roll said retainer from said load groove, up said sloped surface and to said lock groove.

4. A fitting as in claim 3, wherein said garter spring is sized so that it is stretched when it is mounted in said load groove.

5. A fitting as in claim 1, wherein said stop is removably connected to said insert.

6. A fitting as in claim 5, wherein said insert has an annular stop groove formed in the outer periphery thereof, and said stop is removably mounted in said stop groove.

7. A fitting as in claim 6, and further including a dust cap mounted in said stop groove and enclosing a portion of said receptacle.

8. A fitting as in claim 1, and further including a dust cap attached to one of said insert and receptacle and enclosing a portion of said receptacle.

9. A releasable quick-connect fitting comprising tubular insert and receptacle parts, the insert part being movable into said receptacle part on the axis of said parts, said insert part having annular load, lock and release grooves in the outer periphery thereof, said grooves respectively having first, second and third radial dimensions, said lock groove being between said load and release grooves and having a larger radial dimension than said load and release grooves, an annular expansible retainer mounted in one of said grooves, said receptacle having a forward end with a first bore diameter which is larger than the outer diameter of said retainer when said retainer is in either said load or said release grooves but less than the outer diameter of said retainer when said retainer is in said lock groove, said receptacle further having a bore groove and a push surface spaced rearwardly from said forward end, said push surface having a second bore diameter which is less than the outer diameter of said retainer when in any of the grooves and said push surface being operable to move said retainer from said load groove to said lock groove during assembly of the parts, said bore groove, said lock groove and said retainer having slanted surfaces and said retainer being wedged between slanted surfaces of said grooves when said parts are assembled and said retainer is in said lock groove, said fitting further comprising a removable stop engageable between said insert and receptacle parts for limiting the extent of forward movement of said insert into said receptacle during assembly to prevent said push surface from moving said retainer to said release groove, said stop when removed enabling said insert to be moved forwardly to a release groove, thereby enabling diassembly of said parts.

10. A fitting as in claim 1, wherein said retainer and said lock groove have substantially conforming curved surfaces.

11. A releasable quick-connect fitting comprising tubular insert and receptacle parts, the insert part being movable into said receptacle part on the axis of said parts, said insert part having annular load, lock and release grooves in the outer periphery thereof, said grooves respectively having first, second and third radial dimensions, said lock groove being between said load and release grooves and having a larger radial dimension than said load and release grooves, a sloped surface extending radially outwardly from said load groove to said lock groove, a first apex being formed between said sloped surface and said lock groove and a second apex being formed between said lock groove and said release groove, an annular expansible retainer mounted in one of said grooves, said retainer being formed by a garter spring having substantially circular radially extending coils, said receptacle having a forward end with a first bore diameter which is larger than the outer diameter of said garter spring when said garter spring is in either said load or said release grooves but less than the outer diameter of said garter spring when said garter spring is in said lock groove, said receptacle further having a bore groove and a push surface spaced rearwardly from said forward end, said push surface having a second bore diameter which is less than the outer diameter of said garter spring when in any of the grooves and said push surface being operable to roll said garter spring from said load groove, up said slanted surface, to said lock groove during assembly of the parts, said bore groove, said lock groove and said garter spring having slanted surfaces and said garter spring being wedged between said slanted surfaces of said grooves when said parts are assembled and said garter spring is in said lock groove, said fitting further comprising a removable stop engageable between said insert and receptacle parts for limiting the extent of forward movement of said insert into said receptacle during assembly to prevent said push surface from moving said garter spring to said release groove, said stop when removed enabling said insert to be moved forwardly to a release position where said push surface moves said garter spring over said second apex to said release groove, thereby enabling disassembly of said parts.

12. A fitting as in claim 11, wherein said insert part has an annular stop groove formed in the outer periphery thereof, and said stop is removably mounted in said stop groove.

13. A fitting as in claim 12, and further including a dust cap mounted in said stop groove.

14. A fitting as in claim 11, and further including a dust cap attached to one of said insert and receptacle parts.

15. A fitting as in claim 11, wherein said garter spring is sized so that it is stretched when it is mounted in said load groove.

16. A fitting as in claim 11, wherein said retainer and said lock groove have substantially conforming curved surfaces.

17. A releasable quick-connect fitting, comprising
(a) a tubular insert having an axis, and having an annular lock groove and an annular release groove in the outer periphery thereof, said lock groove having a forward side which is slanted outwardly and forwardly relative to said axis, and said release groove having a smaller diameter than said lock groove,
(b) a cylindrical receptacle coaxial with said insert and having a bore for receiving said insert and having an annular bore groove in said bore, said bore groove having a rearward side which is slanted inwardly and rearwardly relative to the axis of said receptacle,
(c) an annular retainer mounted in one of said lock and release grooves and movable to the other of said lock and release grooves, said retainer comprising a garter spring formed by substantially circular radially extending coils,
(d) said insert being movable to a lock position in said receptacle wherein said lock and bore grooves are substantially in radial alignment and said retainer extends into said lock and bore grooves, and is wedged between said slanted forward and rearward sides of said grooves, and said retainer being movable to a release position in said receptacle wherein said release and bore grooves are substantially in radial alignment and said retainer extends into said release groove and is out of engagement with said receptacle, and
(e) a stop removably connected to one of said insert and receptacle and engageable with the other, said stop preventing movement of said insert to said release position but enabling movement to said release position when removed, said receptacle including a push surface located to move said retainer from said lock groove to said release groove, said insert further having an annular load groove formed in the outer periphery thereof, a sloped surface extending radially outwardly and rearwardly from said load groove to said lock groove, said garter spring being initially mounted in said load groove, and said push surface being located to roll said retainer from said load groove, up said sloped surface and to said lock groove, and further including apexes formed on said insert between said load groove and said lock groove and between said lock groove and said release groove.

* * * * *